Patented Sept. 4, 1951

2,567,137

UNITED STATES PATENT OFFICE 2,567,137

INTERPOLYMERIZATION OF STYRENE AND FROSTING DRYING OIL IN PRESENCE OF MONOCYCLIC ALPHA-TERPENE

Leslie Ernest Wakeford and Donald Helmsley Hewitt, London, England; Ernest Booth and Richard Hartlebury Buckle, executors of said Donald Helmsley Hewitt, deceased, assignors, by mesne assignments, to The Sherwin-Williams Company, Cleveland, Ohio, a corporation of Ohio No Drawing. Application October 22, 1945, Serial No. 623,888. In Great Britain November 3, 1944

21 Claims. (Cl. 260—23)

This invention relates to the manufacture of interpolymers of styrene by co-polymerisation of styrene with unpolymerised frosting drying oils, and of coating compositions obtained therefrom.

Various methods have been proposed for the pre-treatment of frosting drying oils to render them non-frosting. For example, frosting drying oils may be heated alone, or in admixture with non-frosting drying oils or with a phenolic or other natural or synthetic varnish resin; the temperatures and times employed for the treatment vary according to circumstances, but in the procedures just mentioned a substantial increase in the viscosity of the oil takes place.

U. S. Patent 2,392,710, dated January 8, 1946, of which the present application is a continuation-in-part, describes a process for the production of interpolymers of aromatic vinyl hydrocarbons with polyhydric alcoholic mixed esters containing substantial proportions of unsaturated fatty acid radicles by first subjecting a polyhydric alcoholic mixed ester, or a mixture of such esters (other than products obtained by heat blending a frosting drying oil with a varnish gum or resin), to a polymerising heat treatment so as to produce a partially polymerised product having a desired predetermined degree of polymerisation, thereupon adding an aromatic vinyl hydrocarbon to the partially polymerised polyhydric alcoholic mixed ester or mixture of such esters and then subjecting the mixture of the said materials to a further polymerisation treatment in the presence or absence of a suitable common solvent for the several ingredients. Amongst the examples of the process described in the prior specification above referred to, there may be mentioned the reaction of styrene with partially polymerised polyhydric alcoholic mixed esters such as linseed stand oil, dehydrated castor oil, or the product obtained by heating together glycerol, phthalic anhydride and linseed oil fatty acids, the reaction being effected by heating the ingredients in various solvents such as turpentine, xylol, or mineral spirits.

Further for the production of non-frosting varnishes from frosting drying oils, such as China-wood oil, Japanese wood oil and oiticica oil, by a co-polymerisation with styrene in the presence of xylene, it has been proposed first to pre-treat the oil by heat blending it, either in the raw state or after it has been blown or bodied, with a small proportion of a varnish gum or resin. The styrene oil varnish resins so produced were stated to be useful as coating compositions.

The present invention has for its object to obviate the necessity for pre-treating frosting drying oils in the manufacture of non-frosting varnish compositions from such oils by copolymerisation with styrene. For this purpose according to the present invention for the production of compatible soluble styrene-oil interpolymers of a non-frosting character from styrene and unpolymerised frosting drying oils, the reaction between the styrene and the oil is effected in the presence of a solvent consisting of or comprising a monocyclic alpha terpene. Preferably the terpene, for example dipentene, is used in admixture with other solvents such as xylol or mineral spirits.

By means of the improved process according to the present invention the chain length of the polystyrene portion of the interpolymer that is formed can be so regulated that products of desirable characteristics for use in the manufacture of paints, varnishes and lacquers can be obtained notwithstanding the employment in the process of unpolymerised frosting drying oils.

As examples of unpolymerised frosting drying oils for use in the improved process according to the present invention there may be mentioned raw tung oil and oiticica oil both in its raw condition and as commercially provided in the liquid state known as "Cicoil" (registered trade-mark); in its latter condition the oiticica oil has been heated only sufficiently to render it more convenient in use, but it still possesses all the characteristics of a frosting drying oil.

The following examples, in which all the various parts mentioned are by weight, illustrate various methods of carrying out the present invention when applied to the production of interpolymers from styrene and either oiticica oil or tung oil.

EXAMPLE 1

*(Illustrating the effect of a small addition of a monocyclic alpha terpene to the main solvent)*

50 parts of raw oiticica oil were dissolved in 90 parts of xylol to which 10 parts of dipentene had been added. 50 parts of monomeric styrene were then added and the whole mixture heated under a reflux condenser for 37½ hours. The clear varnish solution thus obtained, which had a solids content of 41 per cent and a viscosity of 100 seconds measured in the Ford No. 4 cup at 25° C., gave clear non-frosting films.

In a comparable experiment to that described in Example 1 above but without the dipentene, 50 parts of oiticica oil were dissolved in 100 parts of xylol, and 50 parts of monomeric styrene were then added. The mixture was heated under a reflux condenser for 26 hours and a clear solution of a viscosity of 23 seconds measured in the Ford No. 4 cup at 25° C. was obtained. A portion of this solution was then heated for a further two hours, when gelation occurred. A film formed from the fluid product, to which cobalt naphthenate driers had been added (0.03 per cent cobalt metal to the solution), air dried to give frosted films. The varnish, especially when containing driers, was unstable in the can.

EXAMPLE 2

(*Illustrating the use of an increased proportion of monocyclic alpha terpene with a small excess of styrene in the reaction mixture*)

Raw oiticica oil was heated to 210° C. in 30 minutes, maintained at that temperature for one hour, and then filtered. The product obtained by this treatment, which will be referred to hereinafter as isomerised oiticica oil, is still however a frosting drying oil, the objects of the treatment being simply to purify the oil and to convert it into a product which is liquid and thus easier to handle than the solid or practically solid raw oiticica oil. To 100 parts of the isomerised oiticica oil there were then added 150 parts of monomeric styrene, 75 parts of commercial dipentene, and 175 parts of mineral spirits, and the whole mixture was then heated under a reflux condenser, whilst blowing a stream of air therethrough, for 17 hours to a viscosity of 92 seconds measured in the Ford No. 4 cup at 25° C. The unreacted styrene was removed by distillation and an equal weight of mineral spirits was then added to the resulting resin solution, which, after the addition thereto of naphthenate driers to give 0.05 per cent and 0.15 per cent metallic cobalt and lead respectively based on the solids content of the solution, gave clear, non-frosting films, touch dry in 1½ hours. The resin solution prepared as just described was stable in the can in the presence of the added driers.

EXAMPLE 3

(*Illustrating the use of a relatively high proportion of monocyclic alpha terpene in conjunction with a larger excess of styrene*)

1685 parts of 95 per cent monomeric styrene, 1600 parts of dipentene and 800 parts of isomerised oiticica oil (made as described in Example 2 above) were heated under a reflux condenser for 17½ hours; the solution so obtained had a solids content of 40.3 per cent. 1800 parts of excess styrene and dipentene were then removed by distillation from the reaction mixture and the residue was thinned with 1350 parts of mineral spirits to a viscosity of 135 seconds measured in the Ford No. 4 cup at 25° C. After the addition to the product obtained as just described of driers, in similar proportions to those given in Example 2 above, a film formed therefrom dried to a tough coating, touch dry in four hours.

When using mixtures of solvents in effecting the polymerisation, control of the speed of the reaction may be obtained by adding either the monocyclic alpha terpene or the main solvent at intervals during the progress of the reaction.

EXAMPLE 4

100 parts isomerised oiticica oil and 200 parts monomeric styrene were heated under a reflux condenser, whilst blowing a stream of air therethrough, for thirty minutes. 50 parts commercial dipentene were then added and refluxing continued for thirty minutes, after which three further portions, amounting to 50 parts each, of dipentene were added at ten minute intervals, reflux being continued for 40 minutes after the last addition of dipentene. The resulting interpolymer contained 70 per cent oil and the resin solution had a viscosity of 20 seconds measured in the Ford No. 4 cup at 25° C.

In such cases as exemplified by the above experiment, the more volatile solvent may be distilled off together with unreacted styrene to adjust solvent balance and recover the latter.

The application of the present invention to the use of China-wood or tung oil is illustrated by the two following examples:

EXAMPLE 5

100 parts of tung oil, 200 parts monomeric styrene and 200 parts dipentene were heated under a reflux condenser for 31½ hours to a solids content of 46.6 per cent, whereby there was obtained a resin solution of 38 seconds viscosity measured in the Ford No. 4 cup at 25° C. Films flowed from this product, after the addition thereto of driers in similar proportions to those given in Example 2 above, stoved, without frosting, to a tough coating having excellent adhesion.

EXAMPLE 6

150 parts of monomeric styrene, 100 parts of tung oil, 25 parts of dipentene and 225 parts of mineral spirits were heated under a reflux condenser for 23 hours to a viscosity of 37 seconds measured in the Ford No. 4 cup at 25° C. The resulting resin solution, after the addition thereto of driers in similar proportions to those given in Example 2 above, gave films which stoved to a good hardness without frosting.

Where no monocyclic alpha terpene is present in the co-polymerisation of frosting drying oils with relatively large proportions of styrene, gelation occurs when only small quantities of styrene have reacted; addition of an inert solvent such as xylol merely increases the reaction time without preventing sudden gelation at low degrees of styrene combination. All the products obtained when carrying out the co-polymerisation under the conditions just stated, that is with no monocyclic alpha terpene present, give frosted films in the presence or absence of driers.

When a monocyclic alpha terpene is introduced into a reaction mixture of equal weights of styrene and frosting drying oil, the reaction time is prolonged, rapid increase of viscosity leading to gelation is avoided and the viscosity of the product decreased at a given degree of styrene reaction. Moreover considerably greater proportions of styrene can be reacted before gelation occurs and it is found that the reactions can in fact proceed to such a stage that the films formed from the resin solutions do not frost, whilst the can stability of the product is excellent. Where excess of styrene is used, the reaction times are decreased and the drying properties of the films formed from the product are improved. By varying the relative proportions of styrene, frosting drying oil, and monocyclic alpha terpene, products of a wide range of oil contents, viscosities, drying time and film hardness may be prepared. Moreover by adding a portion only of the requisite quantity of styrene or terpene to the reaction mixture at the commencement of the reaction, and adding the remainder of the styrene or terpene as the case may be in determined portions over predetermined intervals of time during the course of the reaction for the production of the styrene-oil interpolymers, further variations in the character of the interpolymers produced may be obtained.

The method according to the present invention may also be employed to render non-frosting the films formed from the copolymers of styrene and mixtures of frosting and non-frosting drying oils which would otherwise yield frosted films when co-polymerized in the absence of terpenes.

The necessary amount of dipentene (or other monocyclic alpha terpene) to be used with any particular main solvent (such as an aromatic hydrocarbon, for instance xylol, and/or an aliphatic hydrocarbon, for instance mineral spirits) can be determined by experiment in accordance with the particular oil which is to be co-polymerised with the styrene.

The avoidance of the pre-treatment of the frosting drying oils (which treatment results in an oil of higher viscosity) by the use of monocyclic alpha terpenes according to the present invention enables products to be prepared of lower viscosity than, but having the same final composition as, the products obtainable without the employment of such terpene solvents, whilst at the same time the can stability of the products obtained by the present process is improved.

By the present process there can be obtained products which, as contrasted with polystyrene, are specially useful for the production of coating compositions such as paints; in particular, despite their rapid drying characteristics, they give, on pigmentation, enamels having excellent gloss and good application properties by brush or spray. The new products are also useful as a basis for stove enamels using low temperatures. Other applications of products manufactured in accordance with the invention include aircraft and motor-car finishes, electrical insulating materials, adhesive materials, printing inks, moulded compositions and laminated materials.

What we claim and desire to secure by Letters Patent of the United States is:

1. A non-catalytic process for the production of compatible styrene-oil interpolymers of a non-frosting character from styrene and unpolymerized frosting drying oils, which comprises heating the styrene and the oil in the presence of a solvent comprising an amount of a monocyclic alpha terpene sufficient to prevent gelation during interpolymerization and to prevent frosting of films of the product on drying.

2. A process as in claim 1, in which there is employed tung oil as the frosting drying oil.

3. A process as in claim 1, in which there is employed raw oiticica oil as the frosting drying oil.

4. A process as in claim 1, in which there is employed isomerised oiticica oil as the frosting drying oil.

5. A process as in claim 1, in which the monocyclic alpha terpene employed consists of dipentene.

6. A process as in claim 1, in which the reaction between the styrene and the oil is effected in a solvent consisting of an admixture of a monocyclic alpha terpene with an aromatic hydrocarbon.

7. A process as in claim 1, in which the reaction between the styrene and the oil is effected in a solvent consisting of an admixture of a monocyclic alpha terpene with an aliphatic hydrocarbon.

8. A process as in claim 1, in which the reaction between the styrene and the oil is effected in a solvent consisting of an admixture of dipentene with xylol.

9. A process as in claim 1, in which the reaction between the styrene and the oil is effected in a solvent consisting of an admixture of dipentene with mineral spirits.

10. A process as in claim 1, in which there are employed approximately equal quantities of the styrene and the frosting drying oil.

11. A process as in claim 1, in which the reaction for the production of the styrene-oil interpolymers is carried out by heating the reaction mixture under a reflux condenser until a product with the requisite solids content and viscosity is obtained.

12. A process as in claim 1, in which a portion only of the requisite quantity of terpene is present in the reaction mixture at the commencement of the reaction, the remainder of the terpene being added in determined portions over predetermined intervals of time during the course of the reaction for the production of the styrene-oil interpolymers.

13. A process as in claim 1, in which tung oil is employed as the frosting drying oil and the reaction for the production of the styrene-oil interpolymers is carried out by heating the reaction mixture under reflux until a product with the requisite solids content and viscosity is obtained.

14. A process as in claim 1, in which raw oiticica oil is employed as the frosting drying oil and the reaction for the production of the styrene-oil interploymers is carried out by heating the reaction mixture under reflux until a product with the requisite solids content and viscosity is obtained.

15. A process as in claim 1, in which isomerised oiticica oil is employed as the frosting drying oil and the reaction for the production of the styrene-oil interpolymers is carried out by heating the reaction mixture under reflux until a product with the requisite solids content and viscosity is obtained.

16. A process as in claim 1, in which oiticica oil is employed as the frosting drying oil and the reaction between the styrene and the oil is effected in a solvent consisting of an admixture of dipentene with xylol.

17. A process as in claim 1, in which isomerised oiticica oil is employed as the frosting drying oil and the reaction between the styrene and the oil is effected in a solvent consisting of an admixture of dipentene with mineral spirits.

18. A process as in claim 1, in which isomerised oiticica oil is employed as the frosting drying oil and the reaction between the styrene and the oil is effected in a solvent consisting of dipentene.

19. A process as in claim 1, in which tung oil is employed as the frosting drying oil and the reaction between the styrene and the oil is effected in a solvent consisting of dipentene.

20. A process as in claim 1, in which tung oil is employed as the frosting drying oil and the reaction between the styrene and the oil is effected in a solvent consisting of an admixture of dipentene with mineral spirits.

21. Compositions comprising styrene-oil interpolymers produced by the process claimed in claim 1.

LESLIE ERNEST WAKEFORD.
DONALD HELMSLEY HEWITT.

(References on following page)

REFERENCES CITED

The following references are of record in the file of this patent:

UNITED STATES PATENTS

| Number | Name | Date |
|---|---|---|
| 1,910,847 | Maximoff | Mar. 23, 1933 |
| 1,975,959 | Lawson | Oct. 8, 1934 |
| 2,129,478 | Rohm | Sept. 6, 1938 |
| 2,349,210 | Traylor | May 16, 1944 |
| 2,370,688 | Rummelsburg | Mar. 6, 1945 |
| 2,392,710 | Wakeford et al. | Jan. 8, 1946 |
| 2,457,768 | Arvin et al. | Dec. 28, 1948 |

OTHER REFERENCES

Chatfield, "Varnish Constituents," pages 19-21, Pub. 1944 by Interscience Publishers, Inc., New York.